Figure 1:
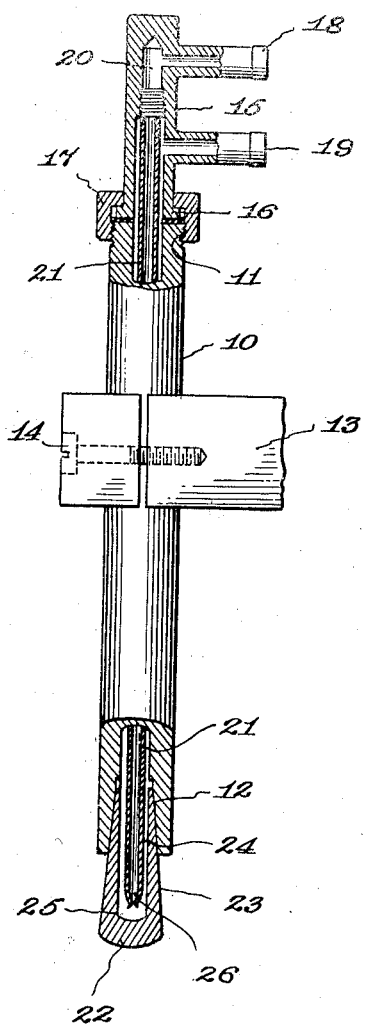

June 24, 1947.   F. R. HENSEL ET AL   2,422,962
WELDING ELECTRODE COOLING
Filed March 11, 1944

INVENTORS
FRANZ R. HENSEL
EARL I. LARSEN
BY Chester F. Carlson
ATTORNEY

Patented June 24, 1947

2,422,962

UNITED STATES PATENT OFFICE 2,422,962

WELDING ELECTRODE COOLING

Franz R. Hensel and Earl I. Larsen, Indianapolis, Ind., assignors to P. R. Mallory & Co., Inc., Indianapolis, Ind., a corporation of Delaware Application March 11, 1944, Serial No. 526,074

8 Claims. (Cl. 219—4)

The present invention relates to the art of welding electrode cooling, and, more particularly, to novel and improved means for internally and externally cooling a welding electrode.

In certain resistance welding operations, particularly when spot welding metals of high electrical conductivity such as aluminum and aluminum alloys, considerable difficulty was experienced in maintaining the welding electrodes at low temperatures. It was customary to provide internal channels or recesses in the welding electrode and its holder and to pass a cooling medium therethrough such as water or some other suitable liquid refrigerant. It was also suggested to surround the welding electrode with a rigid metallic cooling jacket fluid-tightly attached to the outer surface of the electrode and to force a cooling medium through such jacket. None of these conventional expedients, however, was completely satisfactory and successful. During continued resistance welding operations the tip of the welding electrode would soon reach undesirably high temperatures and would spread out or "mushroom," requiring frequent reconditioning or complete replacement of the electrode.

It is an object of the present invention to eliminate this difficulty and inconvenience experienced in the operation of conventional welding electrode and cooling structures.

It is another object of the present invention to provide a welding electrode and holder organization whereby a greatly increased cooling efficiency is obtainable and the welting electrode retains its original shape for a considerably extended period without appreciable spreading out or "mushrooming."

It is a further object of the invention to provide an internal cooling structure for welding electrodes which assures higher speeds and more intimate heat exchange relation of the liquid cooling medium with respect to the critical regions of the welding electrode.

Still another object of the invention is to provide an internally-cooled welding electrode and cooling system therefor in which the flow of a liquid cooling medium is gradually accelerated in the critical region and is again gradually decelerated beyond such region whereby air films, turbulence of the cooling fluid in the critical region and other undesirable operating conditions are avoided and a greatly increased cooling efficiency is obtained.

It is also within the contemplation of the invention to provide external cooling means of novel and improved character which are readily attached and are adaptable to a great variety of welding electrode types.

The invention also contemplates a welding electrode cooling system which is very simple in character, positive and foolproof in operation and which may be easily incorporated into existing welding installations without requiring troublesome or expensive structural changes.

Figure 2:
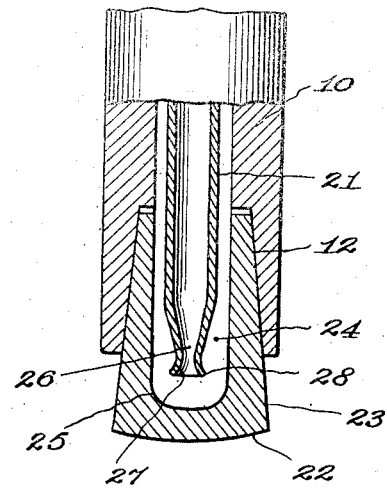
Figure 3:
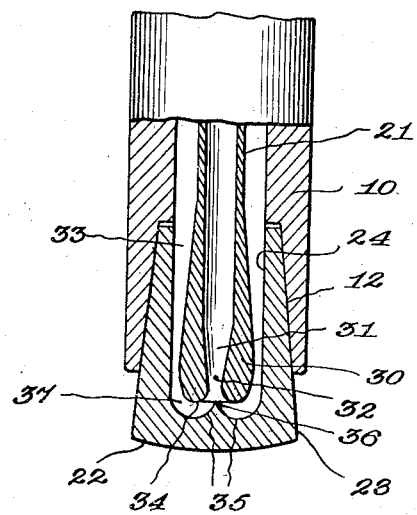

Other and further objects and advantages of the invention will become apparent from the following description taken in conjunction with the accompanying drawing; in which Fig. 1 illustrates a vertical sectional view, having parts in elevation, of a welding electrode and its holder embodying the principles of the present invention;

Fig. 2 depicts a similar sectional view, drawn to a larger scale, of the lower or end portion of the electrode and holder shown in Fig. 1; and Fig. 3 shows a similar view of a modified embodiment of the invention.

While a preferred embodiment of the invention is described herein, it is contemplated that considerable variation may be made in the method of procedure and the construction of parts without departing from the spirit of the invention. In the following description and in the claims, parts will be identified by specific means, for convenience, but they are intended to be as generic in their application to similar parts as the art will permit.

Referring now more particularly to Figs. 1 and 2 of the drawing, reference character 10 denotes a tubular welding electrode holder having a threaded portion 11 at its upper end and a tapered electrode-receiving socket 12 at its lower end. Holder 10 is clamped at the end of arm 13 of the welding machine by means of a screw 14. A hose attachment member 15 is fluid-tightly attached to the holder by means of a shouldered portion 16 and a nut 17 and has nipples 18 and 19 integrally formed therewith for the introduction and the discharge of water or some other cooling liquid. Hose attachment member 15 is formed with a partially threaded axial recess 20 in communication with inlet nipple 18 into which is screwed inlet tube 21 extending throughout the length of tubular holder 10. Outlet nipple 19 is in communication with the tubular recess in the holder. Electrode 22 is provided with a tapered portion 23 forming a tight fit with socket 12 of holder 10 and has a recess 24 therein conforming in shape to the tubular recess in holder 10 and forming continuation thereof.

In order to obtain greater efficiency of heat withdrawal from the critical regions of the surface of recess 24, for convenience indicated by heavy line 25, in accordance with the principles of the present invention, the velocity of flow of the cooling liquid is greatly increased in such region. This is accomplished by providing the end of inlet tube 21 with a portion of greatly reduced diameter in the form of a constricted "throat" 26. The throat may be followed by a slightly divergent outlet nozzle 27 and is preferably provided with rounded or bead-shaped edges 28.

From the foregoing description, the operation of the welding electrode system embodying the principles of the present invention will be readily understood by those skilled in the art. A circulatory flow of cooling liquid is maintained through the electrode and holder by introducing such liquid through nipple 18 and withdrawing it through nipple 19. The cooling liquid will flow at a substantially uniform velocity through inlet tube 21. Its velocity will be greatly increased in throat 26 and cooling liquid under greatly increased pressure and with greatly increased velocity will be brought into intimate heat exchange relation with the critical region 25 within the electrode. Experience has demonstrated that the cooling efficiency of this novel system is greatly superior to those of conventional structures and that the welding electrodes may be used for a greatly extended period without spreading out, or "mushrooming."

The improved cooling system of the invention will further result in steeper temperature gradients in the welding nose of the electrode thereby reducing the temperature at the welding face. This will reduce or will completely eliminate any tendency of the electrode to stick to the work being welded. Sticking is particularly pronounced with conventional cooling systems when welding such metals as aluminum, magnesium, coated steels (tin-coated, zinc-coated steels, tern-plate, etc.), and low melting point metals, such as zinc. The cooling system of the present invention also provides important advantages in welding copper-base alloys of high conductivity.

The modified embodiment of the invention illustrated in Fig. 3 is in many respects similar to the previous embodiment and similar reference characters have been used to denote corresponding parts. It will be noted that inlet tube 21 is formed with reinforced or thickened terminal portions 30 of such shape as to define a contracting conical entrance channel 31, a constricted throat section 32, and an annular expanding conical outlet channel 33 located between the corresponding outer surface of the inlet tube and the inner surface of recess 24. The end of inlet tube 21 is rounded at 34 to a streamlined surface to facilitate reversal of the direction of the liquid flow without the production of turbulence, eddy currents, and the like. This object is further promoted by the provision of heart-shaped rotation surfaces 35 with point 36 in the critical region of recess 24 of the electrode.

The operation of this modified embodiment of the invention may be explained by considering it as an application of the Venturi principle, with the difference, however, that the liquid flow before and after the throat has opposite directions. In other words, constricting channel 31 may be considered to be the entrance cone, throat 32 the throat section, and annular space 33 of expanding cross section the exit cone or Venturi tube. Preferably, the entrance cone has a total angle of about 21 degrees, and the exit cone has a total angle of about 5 to 7 degrees. For best results, the diameter of the throat may be between one-half and one-fourth of the diameter of the straight portion of the inlet tube. It will be noted that the transition from the entrance cone to the throat and from the throat to the exit cone, the latter including the intermediate region or channel 37 where the direction of flow is reversed, is rounded off to smooth, streamlined curves to avoid the resistance caused by sharp corners and to preclude the possibility that the fluid might break away from the confining walls at high speeds. It has been found that in this manner a heretofore unobtainable hydro-dynamic efficiency of the liquid flow through the welding electrode is assured and that intimate heat exchange relation will be maintained between the cooling liquid and the critical regions of the electrode.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. In a cooling system for a pressure exerting welding electrode, the combination which comprises a hollow tubular electrode holder adapted to be clamped to the arm of a welding machine, an electrode held in one end of said holder and having an inner recess therein in communication with the space within said holder, an inlet tube for cooling fluid extending through said tubular holder into the recess of said electrode, and conduit means for introducing cooling fluid into said recess through said inlet tube and for discharging such fluid therefrom through said tubular holder, the terminal regions of the walls of said inlet tube internally defining a contracting entrance cone and a constricted throat and externally defining with the surface of said recess an expanding annular channel.

2. In a supporting and cooling structure for pressure exerting welding electrodes, the combination which comprises a hollow tubular electrode holder adapted to be clamped to the arm of a welding machine, an electrode held in one end of said holder and having an inner recess therein in communication with the space within said holder, an inlet tube for cooling fluid extending through said holder into the recess of said electrode, and conduit means connected to said tube and said holder to maintain a circulatory flow of said fluid through said recess, the terminal regions of the walls of said inlet tube being reinforced to internally define a convergent conical entrance channel and constricted throat and to externally define with the surface of said recess a streamlined constricted flow-reversing intermediate channel and a divergent annular discharge channel.

3. In a supporting and cooling structure for pressure exerting welding electrodes, the combination which comprises a hollow tubular electrode holder adapted to be clamped to the arm of a welding machine, an electrode held in one end of said holder and having an inner recess therein in communication with the space within said holder, and inlet tube for cooling fluid extending through said holder into the recess of said electrode, and conduit means connected to said tube and said holder to maintain a circulatory flow of said fluid through said recess, the terminal regions of the walls of said inlet tube being reinforced to internally define a convergent conical entrance channel having a total angle of about 21 degrees and a constricted throat, and to externally define with the surface of said recess a streamlined constricted flow-reversing intermediate channel and a divergent annular discharge channel having a total angle of about 5 to 7 degrees.

4. The supporting and cooling structure for pressure exerting welding electrodes defined in claim 3 wherein the constricted throat has a diameter which is between one-half and one-fourth of the diameter of the straight portion of the inlet tube.

5. The supporting and cooling structure for pressure exerting welding electrodes defined in claim 1 wherein the bottom portion of the recess in the welding electrode is defined by a rotation surface having an inverted heart-shaped cross-section.

6. A resistance welding electrode comprising a rod formed with a longitudinal coolant hole opening through its butt end, an inlet tube for coolant fluid extending into said coolant hole, and conduit means for introducing coolant fluid into said coolant hole through said inlet tube and for discharging such fluid from said hole, the terminal regions of the walls of said inlet tube internally defining a contracting entrance cone and a constricted throat and externally defining with the surface of the coolant hole an expanding annular channel.

7. A resistance welding electrode comprising a rod formed with a longitudinal coolant hole opening through its butt end, and means including an inlet tube defining with said hole a completely streamlined channel for a fluid coolant, said channel including an axial contracting entrance cone, a constricted throat, an annular expanding outlet portion, and a flow-reversing portion where the coolant is in intimate heat exchange with the bottom surface of said hole substantially opposite to the work-engaging face of said rod.

8. The method of cooling a resistance welding electrode rod having a longitudinal coolant hole opening through its butt end which comprises axially introducing a flow of coolant fluid into said hole, gradually constricting said flow into the shape of an entrance cone in the region before the bottom of said hole, gradually expanding said flow into an annular shape in the region after the bottom of said hole, gradually reversing the direction of said flow in the bottom region of said hole, and controlling said flow in such a manner as to maintain its streamlined character throughout said constricting, expanding and flow-reversing regions thereby to prevent the production of turbulence and of eddy currents in the flow.

FRANZ R. HENSEL.
EARL I. LARSEN.

REFERENCES CITED

The following references are of record in the file of this patent:

UNITED STATES PATENTS

| Number | Name | Date |
|---|---|---|
| 1,256,951 | Thomson | Feb. 19, 1918 |

FOREIGN PATENTS

| Number | Country | Date |
|---|---|---|
| 40,610 | France | Apr. 26, 1932 |